June 7, 1955

L. JENSEN 2,710,008

COMPRESS

Filed March 20, 1952

INVENTOR
LEE JENSEN

BY *Harold K. Martin*

ATTORNEY

US patent 2,710,008, patented June 7, 1955.

2,710,008

COMPRESS

Lee Jensen, Chattanooga, Tenn.

Application March 20, 1952, Serial No. 277,645

1 Claim. (Cl. 128—403)

This invention relates to a compress for applying localized moist heat to an area of the anatomy and thus to produce hyperemia or an increase in the blood supply to the area and constitutes a continuation in part and substitute for my application Serial Number 123,010, now forfeited.

Many and varied methods of applying heat to an affected portion of the anatomy have been practiced in an effort to produce hyperemia and experiments have taught that one of the most satisfactory methods of producing hyperemia is through the use of moist heat.

Moreover it has been found that time is an important factor in producing hyperemia and that change in blood flow and deep temperatures require the application of moist heat for a period of at least twenty minutes and that within a period of about thirty minutes the rate of blood flow can be increased in an amount exceeding 200 percent above normal.

Heretofore in effecting adequate application of moist heat to an effected area of the anatomy for a period of time sufficient to produce hyperemia, resort has been made to immersing the affected part in hot water. This has not proven wholly satisfactory owing to the impossibility of immersing certain portions of the anatomy in hot water. Hence it becomes evident that other means of applying moist heat to an affected part must be resorted to. One of the most satisfactory methods of producing hyperemia, is by subjecting the affected part to moist heat in the form of saturated air and to this end elaborate and bulky apparatus has been devised which in use has produced excellent clinical results. Owing to the bulk and cost of such apparatus, however, its use has been confined to institutions. A more popular method of producing hyperemia employs hot moist compresses, such as towels, blankets and the like which are immersed in hot water and from which the water is squeezed or wrung to prevent dripping. Wringing and squeezing of the towels, blankets or the like is required owing to the nature of the material from which the compresses are made. Such wringing and squeezing of the towels, however, produces tremendous loss of hot water with the result that the compress cools rapidly and repeated heating and wringing of the towels is required in order to supply the necessary heat to the affected part for a period of time sufficient to produce hyperemia. Hence it has been necessary for the patient to receive his treatment with the aid of an attendant who was kept busy for a period of at least twenty minutes changing and wringing the hot applications.

The primary object of this invention is to facilitate the application of moist heat to an area of the anatomy and to retain the heat and moisture in a single application for a period of time sufficient to produce hyperemia.

Another object is to avoid the necessity of using elaborate equipment for subjecting an area of the anatomy to the prolonged application of moist heat.

A further object is to enable the patient to apply localized moist heat to an area of his anatomy for a period of time sufficient to produce hyperemia and thus to dispense with the services of an attendant.

The above and other objects may be attained by employing this invention which embodies among its features a flexible compress comprising a water pervious envelope enclosing an inert water insoluble inorganic material possessing the ability to adsorb and retain an amount of water equal to at least four times its dry weight.

Other features include enclosing in a flexible water pervious envelope which is divided into separate cells, a water insoluble inorganic material of low thermal conductivity, possessing the ability to adsorb and retain a relatively large volume of water and which when saturated will expand to at least fourteen times its dry bulk.

Still other features include incorporating in the envelope and in the contents thereof a substance possessing properties which inhibit fungus development and growth.

Further and more specific features include a heat and water retaining dripless compress for applying localized moist heat to an area of the anatomy and capable of conforming substantially to the contour of the area, said compress comprising a flexible water pervious envelope and a filling in said envelope comprising a hydrated colloidal suspension of an inert water insoluble hydro-philic inorganic material possessing the quality of retaining heat over relatively long periods of time, and loops on the envelope to facilitate the handling thereof.

Other features include separating the envelope longitudinally into two groups of juxtaposed elongated cells in which the cells of the respective groups lie in alignment so that when the compress is hydrated ballooning of the envelope is inhibited and the compress is rendered sufficiently pliable to conform to the shape of the area of the anatomy being treated.

This application is a continuation in part of my co-pending application Serial No. 123,010, filed October 22, 1949.

In the drawing—

Figure 1:
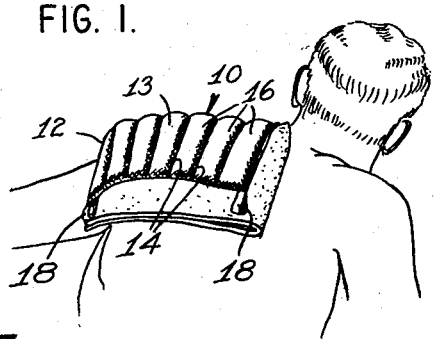
Figure 1 is a view illustrating this improved compress in use.
Figure 2:
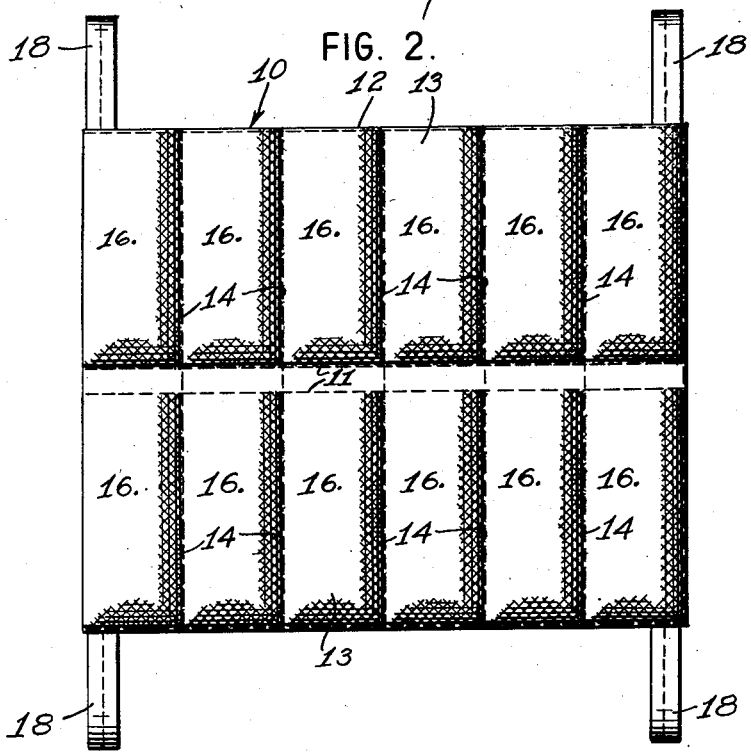
Figure 2 is a plan view of a compress embodying the features of this invention.
Figure 3:
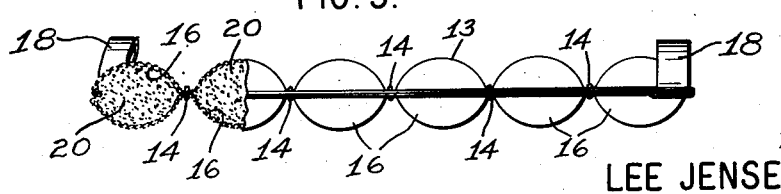
Figure 3 is an edge view of the compress illustrated in Figure 2, showing a portion thereof in section.

Referring to the drawings in detail this improved compress comprises an elongated substantially rectangular envelope designated generally 10 of a suitable water pervious material such as a woven fabric 12 having a thread count of about 64 x 96 per square inch. The mesh size of the fabric should be above 200 mesh per square inch and yet not so small as to materially reduce the water penetrability of the fabric.

In the preferred form of the invention opposite sides of the envelope are stitched together longitudinally as at 11 to form along adjacent opposite side edges pockets 13. These pockets are stitched at longitudinally spaced intervals as at 14 to form separate cells 16 which are joined along adjacent sides by webs. This lends flexibility to the compress and facilitates its conformation to the contours of the area of application. A suitable handling loop 18 of any suitable flexible material is fixed to the envelope adjacent each corner thereof to facilitate the handling of the compress during its immersion and application to the area to be treated.

In order to give the compress the properties necessary to produce hot moist application to an area of the anatomy for a period of time sufficient to produce hyperemia, each cell 16 contains a relatively small amount of an inert water insoluble, hydro-philic, inorganic material possessing the ability to adsorb and retain an amount of water equal to at least four times its dry weight and which will when hydrated expand to at least fourteen times its dry bulk. The substance that I prefer to use is montmorillonite, commonly referred to as Black Hills bentonite of the quick hydrating type. While some of the bentonites occurring in nature possess quick hydrating and swelling characteristics and the ability to adsorb and hold a large volume of water, some types of bentonites not only do not swell nor will they retain water in sufficient volume for my purpose. Moreover still other bentonites of the swelling and water retaining type hydrate slowly and require treatment such as that described in Patent No. 2,036,617. Whether the quick hydrating characteristic occurs in natural bentonite, or is the result of subsequent treatment, is of no consequence insofar as this invention is concerned, so long as the bentonite possesses the quality of adsorbing and retaining large volumes of water and hydrates rapidly.

Upon immersing in water the envelope containing the bentonite, the contents of the envelope will adsorb and retain a relatively large volume of water, as above described, and form a colloidal suspension 20 of bentonite in water, which is of a stiff paste-like consistency and fills the cells 16 and renders them substantially rigid. The compress can be molded and shaped to fit the contour of the area to be treated however as it is foldable along the longitudinal stitching 11 and bent along the rows of stitches 14.

Owing to the ability of the bentonite to adsorb and hold a large volume of water, it is evident that a compress constructed as above described and which has been saturated with hot water will retain its heat for a long period of time. In fact actual tests have shown that such a compress having a cell size when hydrated of about one inch in diameter which is heated in water to a temperature of 168° Fahrenheit will loose only 12° F. in forty minutes which is a period of time longer than is ordinarily necessary to produce hyperemia.

In order to inhibit the development and growth of fungi in the compress, I prefer to employ suitable fungicides, one such compound comprising dihydroxy dichlorodiphenyl methane. This substance is dissolved in a mixture of acetone, carbon tetrachloride and a petroleum solvent such as that sold under the trade name Varsol. The bentonite particles are sprayed with this mixture and allowed to dry. The same mixture is used as a bath in which the envelope is dipped and subsequently allowed to dry.

Another suitable fungicide is carbonyl-p-oxybenzoate such as that sold under the trade name of "Moldex" which for my purpose is dissolved in alcohol and sprayed onto the bentonite particles and onto the envelope.

Still another fungicide which is suited for use with a compress such as above described comprises a compound of sodium ethyl mercuri thiosalicylate such as is sold under the trade name "Merthiolate." This substance is soluble in either alcohol or water and when treating the bentonite, I find it most desirable to dissolve it in alcohol and spray it onto the bentonite particles, while in treating the envelope, the substance is preferably dissolved in water and the envelope saturated with the solution.

In use a compress constructed as above described and preferably treated with a fungicide is immersed in a tray containing water heated to above 105° F. As the water enters the cells through the water pervious walls thereof, it is immediately adsorbed by the bentonite which expands to several times its dry bulk and forms a viscous gel which holds within the confines of the envelope not less than ten times its dry weight of water. It will thus be seen that the compress not only retains the moisture but constitutes a reservoir for the heat of the water and hence with but a single immersion of the compress a treatment may be given for a period of time sufficient to produce the desired degree of hyperemia.

While upon extraction of the compress from the hot water bath some water droplets will adhere to the surface of the compress, these are wholly superficial and after they have disappeared no further dripping or running of water from the compress will be experienced. In applying the compress to a part to be treated, I find it advantageous to interpose between the compress and the part, one or more layers of toweling to prevent too great a heat transfer to the surface. The thicknesses of toweling can be reduced as the heating of the area progresses to compensate for loss of heat from the compress.

By hydro-philic as used herein, I mean a substance capable of adsorbing and retaining at least ten times its dry weight of water.

What is claimed is:

As a new article of manufacture a dripless compress for applying localized moist heat to an area of the anatomy and capable of being shaped to conform substantially to the contour of the area being treated, said compress comprising a flexible water pervious envelope, and a filling in said envelope comprising hot water containing bentonite of the montmorillonite type.

References Cited in the file of this patent

UNITED STATES PATENTS

| 2,331,271 | Gilchrist | Oct. 5, 1943 |
| 2,438,643 | Moore | Mar. 30, 1948 |

FOREIGN PATENTS

| 44,432 | Switzerland | July 6, 1908 |
| 766,596 | France | Apr. 16, 1934 |
| 942,656 | France | Sept. 20, 1948 |

OTHER REFERENCES

Ad of the American Colloid Co., 363 West Superior Street, Chicago, Ill., received in Div. 55 in 1936, 1 pg.